(12) United States Patent
Watson

(10) Patent No.: US 11,589,963 B2
(45) Date of Patent: Feb. 28, 2023

(54) INTERMEDIATE PROSTHESIS FOR DENTAL PROSTHESIS INSTALLATION

(71) Applicant: Jason Watson, La Crescenta, CA (US)

(72) Inventor: Jason Watson, La Crescenta, CA (US)

(73) Assignee: WATSON GUIDE IP LLC, La Canada, CA (US)

( * ) Notice: Subject to any disclaimer, the term of this patent is extended or adjusted under 35 U.S.C. 154(b) by 680 days.

(21) Appl. No.: 16/251,069

(22) Filed: Jan. 17, 2019

(65) Prior Publication Data

US 2019/0216581 A1 Jul. 18, 2019

Related U.S. Application Data

(60) Provisional application No. 62/618,424, filed on Jan. 17, 2018.

(51) Int. Cl.
| | | |
|---|---|---|
| *A61C 13/00* | (2006.01) | |
| *A61C 13/01* | (2006.01) | |
| *A61C 13/34* | (2006.01) | |
| *A61C 8/00* | (2006.01) | |
| *A61C 9/00* | (2006.01) | |
| *A61C 13/107* | (2006.01) | |

(52) U.S. Cl.
CPC ...... *A61C 13/0004* (2013.01); *A61C 13/0006* (2013.01); *A61C 13/01* (2013.01); *A61C 8/0001* (2013.01); *A61C 9/0006* (2013.01); *A61C 9/0053* (2013.01); *A61C 13/0001* (2013.01); *A61C 13/34* (2013.01)

(58) Field of Classification Search
CPC . A61C 13/0004; A61C 13/0006; A61C 13/01; A61C 13/0001; A61C 13/34; A61C 13/0003; A61C 13/00; A61C 9/0006; A61C 9/0053; A61C 9/0046; A61C 9/004
USPC .............................................. 433/199, 199.1
See application file for complete search history.

(56) References Cited

U.S. PATENT DOCUMENTS

2018/0008384 A1* 1/2018 Schulter .................. C08L 33/08

* cited by examiner

*Primary Examiner* — Ralph A Lewis
*Assistant Examiner* — Mirayda A Aponte
(74) *Attorney, Agent, or Firm* — Karish & Bjorgum, PC

(57) ABSTRACT

Methods for generating and providing a full arch prosthesis from a pre-existing prosthesis are presented, starting from the pre-existing prosthesis. This prosthesis is removed from the mouth, scanned, and replaced within the mouth. An intermediate prosthesis is generated from the scan, and modified to match a final physiological target configuration of the patient's mouth. The intermediate prosthesis is used to generate a final virtual representation of the target configuration, from which final virtual representation the final working prosthesis is fabricated. The intermediate prosthesis is mounted in the patient's mouth in sections, for desirable repositioning, sections then being bonded together. Copings can be digitally subtracted to enable press fit new copings to be installed. Alternatively, the intermediate prosthesis can include integrated false copings. The intermediate prosthesis is scanned to generate a final digital model or virtual representation of the desired final prosthesis. The final working prosthesis may then be fabricated using the final virtual representation.

20 Claims, 9 Drawing Sheets

1

INTERMEDIATE PROSTHESIS FOR DENTAL PROSTHESIS INSTALLATION

CROSS-REFERENCE TO RELATED APPLICATION

This application claims priority to application Ser. No. 62/618,424, filed Jan. 17, 2018, the contents of which are incorporated by this reference.

FIELD OF THE INVENTION

The present invention relates to dental prostheses simulating a natural dental arch, and more particularly, methods for generating such dental prostheses, based on scanning and modifying a pre-existing prosthesis.

BACKGROUND OF THE INVENTION

Full arch implant rehabilitation entails a number of time consuming issues. These include multiple patient visits numbering between five and twelve or more. Also, the many steps impose a considerable time burden in maintaining proper records.

There exists a need for a method providing a full arch prosthesis, wherein geometric and positional accuracy are provided, dental visits and healing times are minimized, and the prosthesis enables immediate use thereof.

SUMMARY OF THE INVENTION

The present invention starts from a pre-existing prosthesis, such as one in use within the patient's mouth. This prosthesis is removed from the mouth, scanned, and replaced within the mouth. An intermediate prosthesis is generated from the scan, and modified to match final physiological configuration of the patient's mouth. The intermediate prosthesis is scanned to generate a final digital model or virtual representation of the desired final prosthesis. The final working prosthesis may then be fabricated using the final virtual representation.

Building the virtual representation allows a clinician preparing the final working prosthesis to perform many tasks digitally that were formerly performed manually.

Utilizing an intermediate prosthesis, and more particularly, dividing the intermediate prosthesis into sections, enables the clinician to position each section such that once the sections are bonded together, passivity of fit of the intermediate prosthesis is attained. This, along with any other desired configurational change from the pre-existing prosthesis, is captured in the final virtual representation. The final working prosthesis can therefore display all desired configurational attributes.

Another aspect of the novel methods is that copings may either be incorporated into the intermediate prosthesis, or alternatively, precisely formed coping openings can be incorporated. Actual copings can be placed within the intermediate prosthesis using the coping openings, so that coping configuration can be accounted for in the final virtual representation and hence in the final working model.

Because so much of the work exploits the precision of scanning and reliance on digital manipulation, the number of office visits by the patient is minimized. The novel procedures detailed herein reduce patient visits to as few as two visits and typically no more than four.

Also, with many steps being accomplished in one session of digital manipulation, the need for record keeping is minimized. Much of the work can be performed while the patient is healing from corrective procedures which disturb the mouth physiology.

The patient retains the pre-existing prosthesis, which has been replaced in the mouth, and awaits completion of its replacement. When sufficient time has elapsed for healing, typically on the order of four months, the fully ready final workable prosthesis can be installed, and is capable of immediate full loading.

The novel processes utilize existing technology for a more simplified and accurate approach, thereby saving time and the associated cost of this complex procedure. Furthermore, as the patient wears their respective temporary prosthesis for a period of time during the healing phase, the clinician is supervising and maintaining the restoration making sure the patient is comfortable in their bite, the patient has an ideal vertical dimension, and that the occlusion is well balanced. This invention captures the restoration in its refinement since the actual restoration is scanned. Traditional methods are aimed at capturing the patient's vertical dimension and centric not the actual restoration through multiple visits. This invention would probably be considered unconceivable by clinicians and laboratories in the industry since a high degree of accuracy is needed to capture the copings within the restoration that fit onto the abutments that are connected to the implants. These connections must not only be accurate, they also must entail a passive fit without binding or excessive force. Even with the high resolution scanning capability in the industry today, scanning across an arch to detect the most accurate positions with the acceptable passivity needed isn't reliable and for that reason is not being done.

The present invention provides improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein:

FIG. 7;

DETAILED DESCRIPTION

Figure 7:
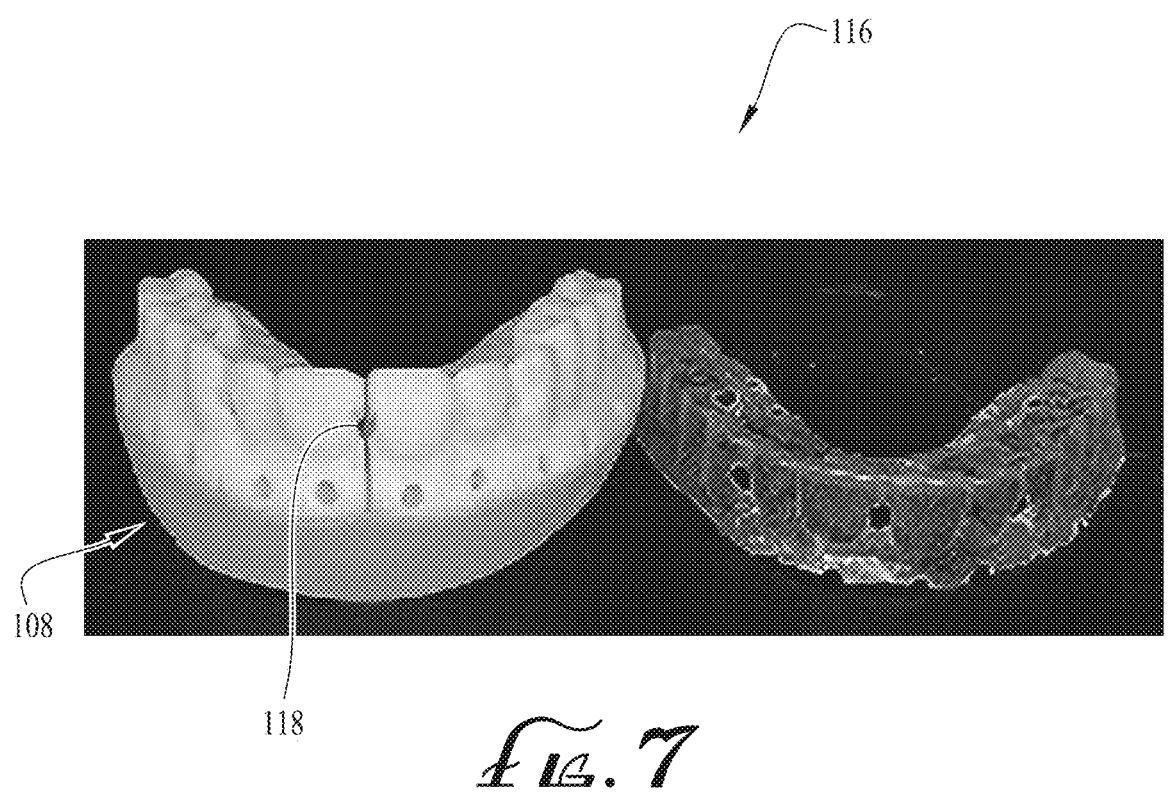
FIG. 7 is a front perspective view of a sectioned intermediate prosthesis and a guard for holding the sections of the sectioned intermediate prosthesis together.
Figure 8:
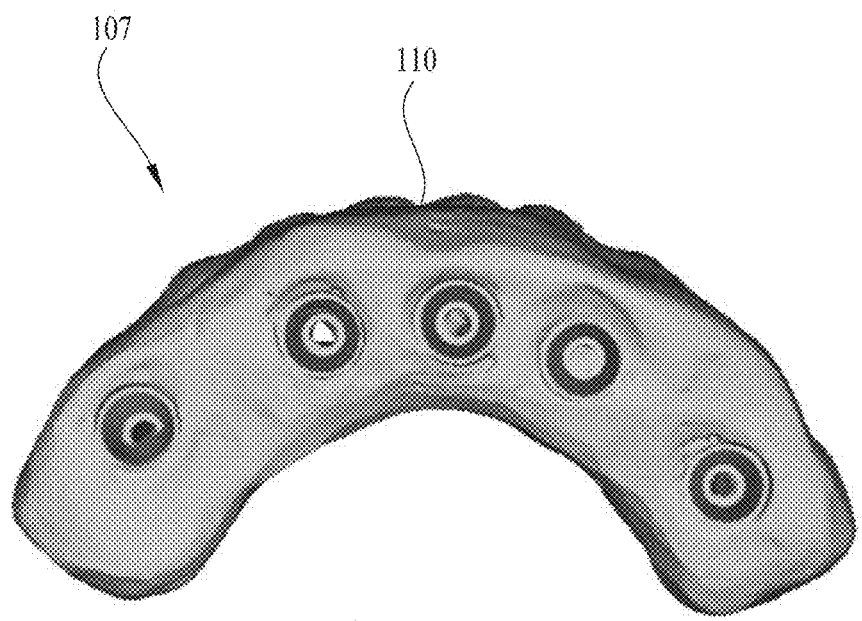
FIG. 8 is a top view of a virtual representation or model of the intermediate prosthesis, shown prior to completion.

Referring first to FIGS. 1-6, according to at least one aspect of the invention, there is shown apparatus and digitized imagery pertaining to a basic method of generating a final working prosthesis 100 of a dental arch from a patient's pre-existing prosthesis 102 of the dental arch and at least one coping 104 used therewith. The method comprises the steps of scanning the patient's pre-existing prosthesis 102 to capture data representing a three dimensional configuration of pre-existing prosthesis 102 to assist in generating a virtual representation of pre-existing prosthesis 102; generating a virtual representation 106 (FIG. 5) of pre-existing prosthesis 102; using the virtual representation 106 of pre-existing prosthesis 102 to assist in generating a virtual representation 107 (FIGS. 8 and 9) of an intermediate prosthesis 108 (see FIG. 7); and generating a virtual representation 107 of intermediate prosthesis 108. The method further includes fabricating a sectioned intermediate prosthesis 108 from virtual representation 107 of intermediate prosthesis 108; installing the sectioned intermediate prosthesis (seen in virtual representation 107 in FIG. 10) into the mouth (shown in FIG. 4) of a patient; fusing the sections of intermediate prosthesis 108 together to create a fused intermediate prosthesis 108 having an intaglio surface 110 (shown on virtual representation 107 in FIGS. 8-10); scanning the fused intermediate prosthesis 108 to assist in generating a virtual representation (not shown, but derived from and corresponding to virtual representation 107) of final working prosthesis 100; and fabricating a final working prosthesis 100 at least in part from the data from virtual representation 107 of the fused intermediate prosthesis 108.

Figure 1:
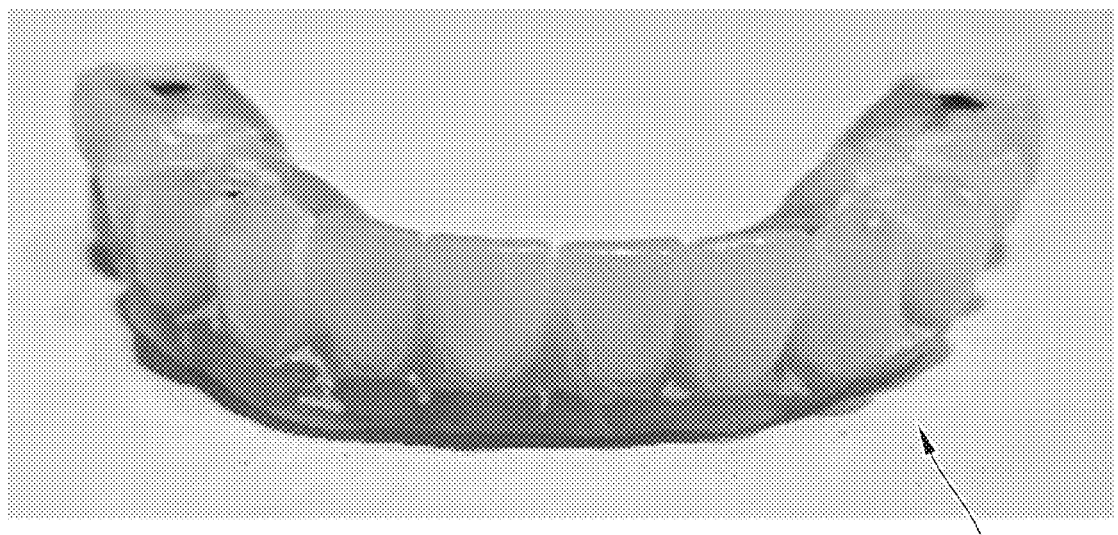
FIG. 1 is a perspective view of a pre-existing full arch prosthesis used as a starting point in generating a corresponding, updated or final working prosthesis.
Figure 2:
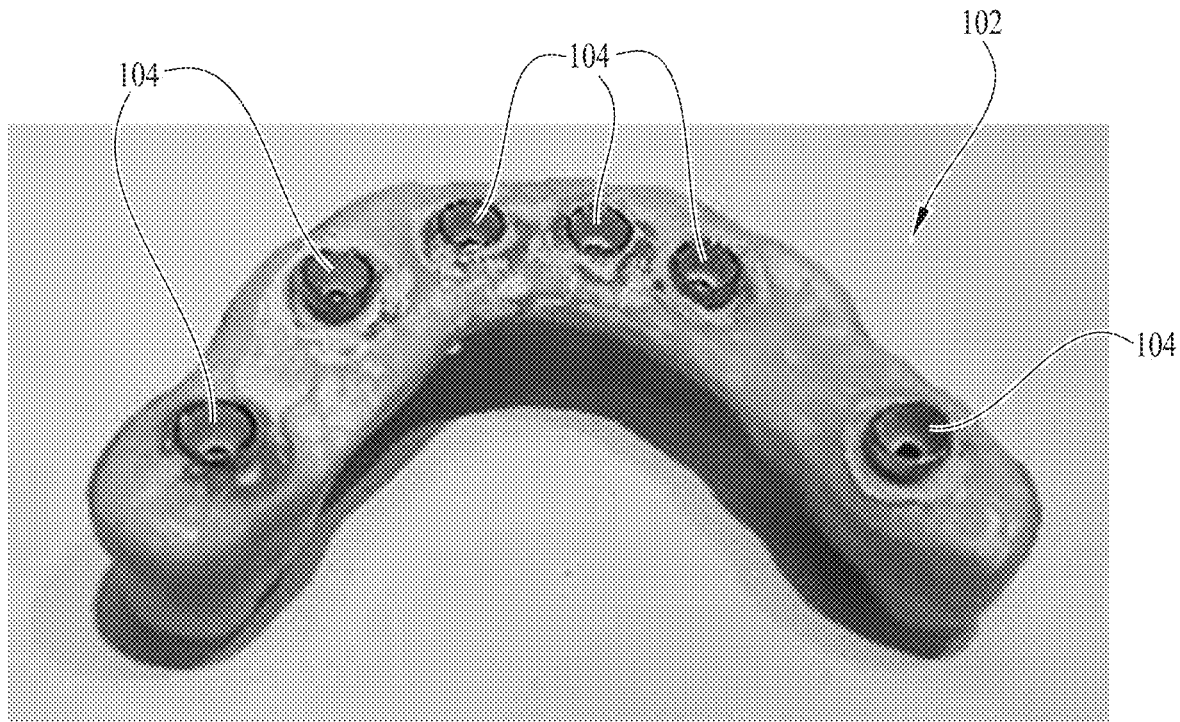
FIG. 2 is a bottom perspective view of the pre-existing prosthesis of FIG. 1.
Figure 3:
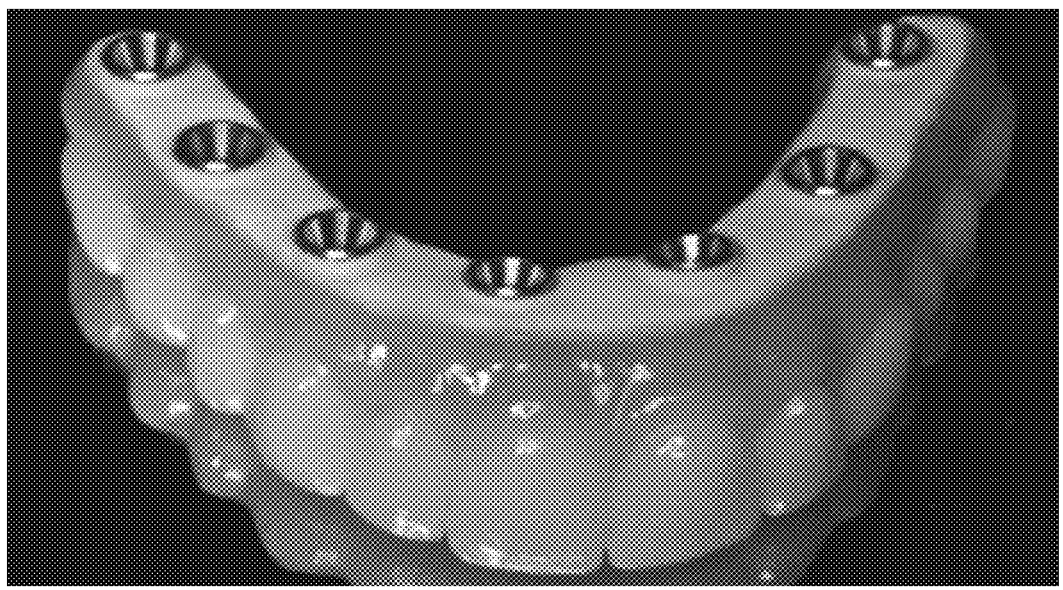
FIG. 3 is a top perspective view of the final working prosthesis.
Figure 4:
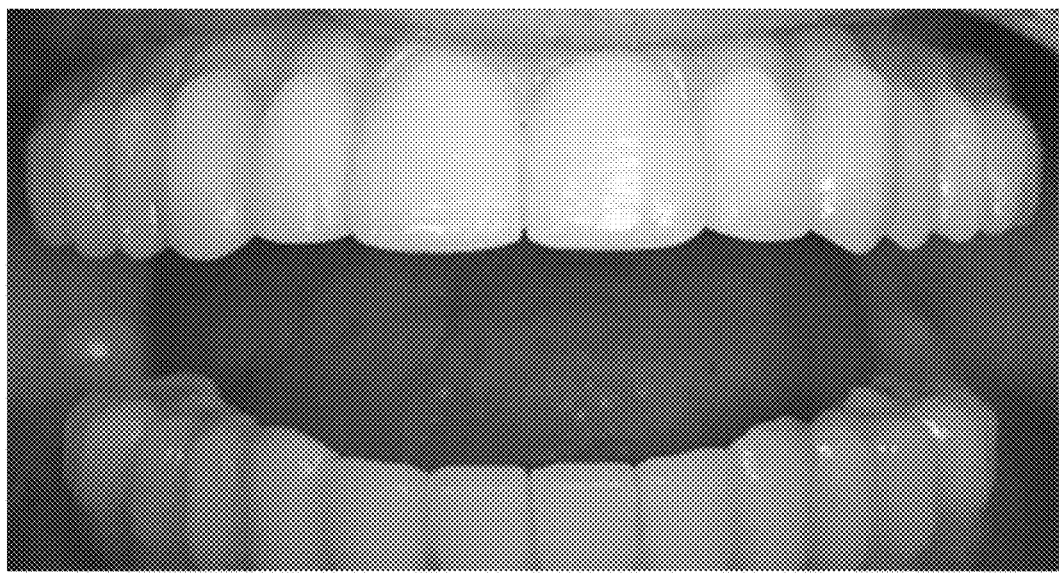
FIG. 4 is an environmental front view of the final working prosthesis.
Figure 5:
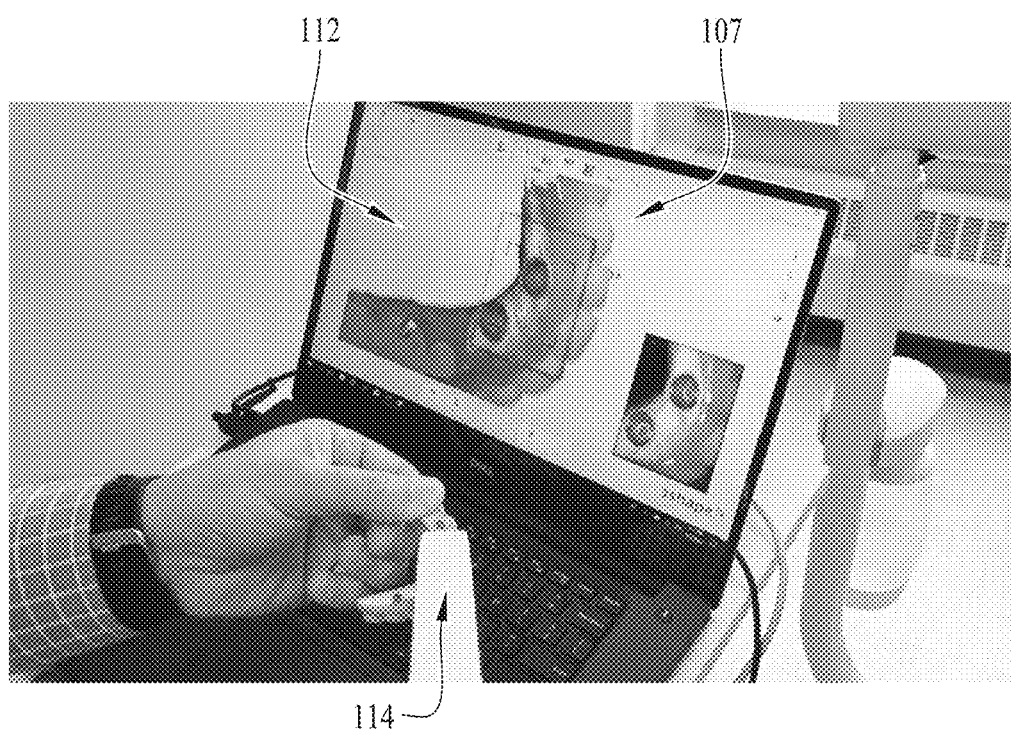
FIG. 5 is an environmental view of a scanning process and apparatus used therewith.
Figure 6:
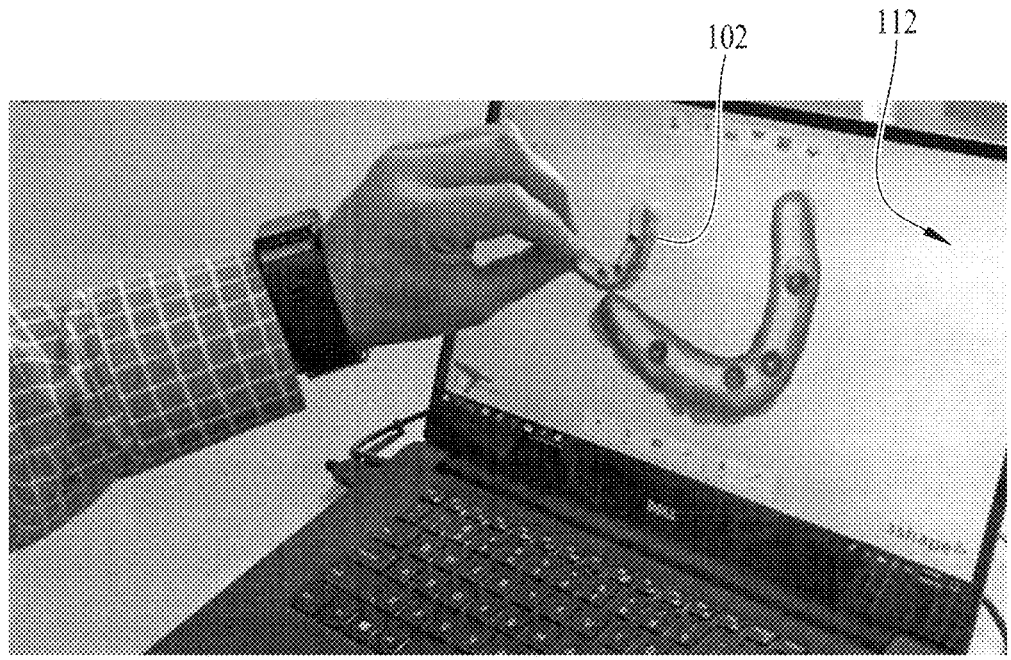
FIG. 6 is an environmental view of the pre-existing prosthesis and the scanning apparatus of FIG. 5.

FIGS. 5 and 6 show a clinician scanning pre-existing prosthesis 102, with imagery of virtual representation 106 visible on a computer screen 112. Scanning is performed with a hand held scanner 114 of FIG. 5. Virtual representation 106 of pre-existing prosthesis 102 evolves to become virtual representation 107 (see FIG. 6) of intermediate prosthesis 108 as updates are entered into the process. Thus it may be said that virtual representation 106 of pre-existing prosthesis 102 assists in generating virtual representation 107 (FIGS. 8 and 9). of an intermediate prosthesis 108 (see FIG. 7).

Sectioning of intermediate prosthesis 108 may be performed by three dimensionally printing or otherwise fabricating individual sections. Alternatively, in the method, the step of fabricating sectioned intermediate prosthesis 108 from virtual representation 107 of intermediate prosthesis 108 may be provided by fabricating intermediate prosthesis 108 and subsequently sectioning intermediate prosthesis 108.

In a further alternative of the method, the step of fabricating sectioned intermediate prosthesis 108 from virtual representation 107 of intermediate prosthesis 108 may be achieved by fabricating sectioned intermediate prosthesis 108 directly from a virtual sectioned intermediate prosthesis (i.e., digital representation or model).

Fabrication may of course use for example a subtractive fabrication method such as machining under computer numerical control.

Installing sectioned intermediate prosthesis (seen in virtual representation 107 in FIG. 10) into the mouth (shown in FIG. 4) of the patient may be expedited by using a guard 116 (FIG. 7) holding the sections together.

Figure 12:
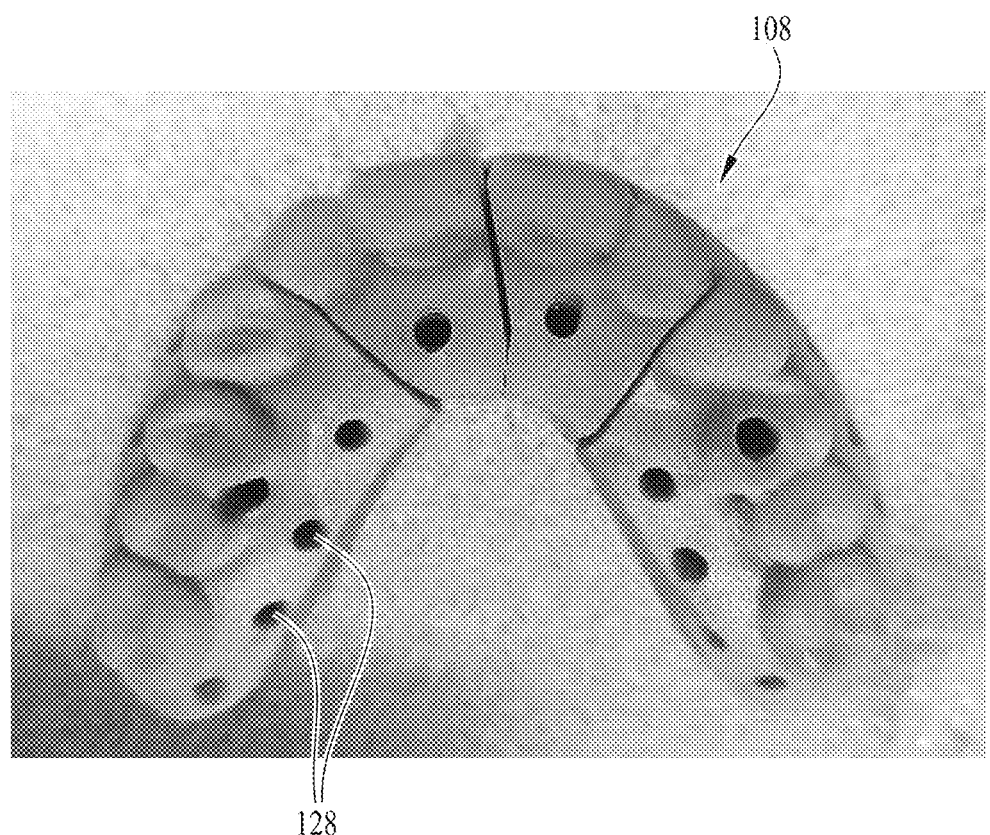
FIG. 12 is a bottom view of the intermediate prosthesis of FIG. 11.
Figure 13:
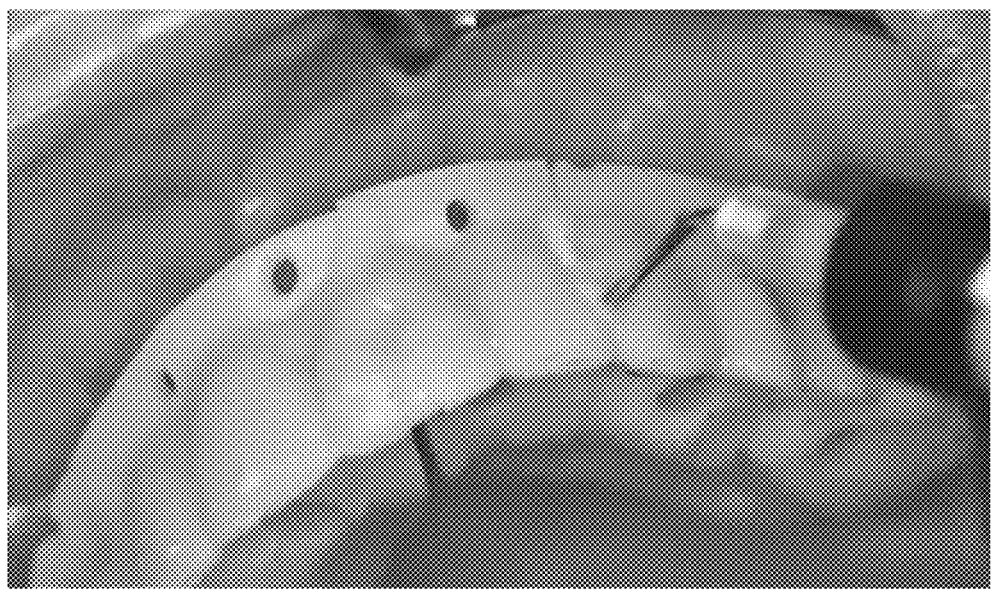
FIG. 13 depicts injection of fluent cement to fuse sections of the sectioned intermediate prosthesis of e.g.

Referring to FIGS. 12 and 13, fusing the sections of intermediate prosthesis 108 together to create the fused intermediate prosthesis 108 may be performed using a fluent, hardenable cement which may be injected into seams between adjacent sections (see FIG. 13) and into ports 118 (best seen in FIG. 7) in intermediate prosthesis 108. Accordingly, the step of fusing the sections together may comprise applying the hardenable cement to the sections.

Scanning fused intermediate prosthesis 108 may be performed using scanner 114 (FIG. 5).

References to assisting in generating a virtual representation at least in part reflect the possibility that other final configurational characteristics may be acquired and incorporated into intermediate prosthesis 108 in subsequent operations and possibly by other methods.

Figure 14:
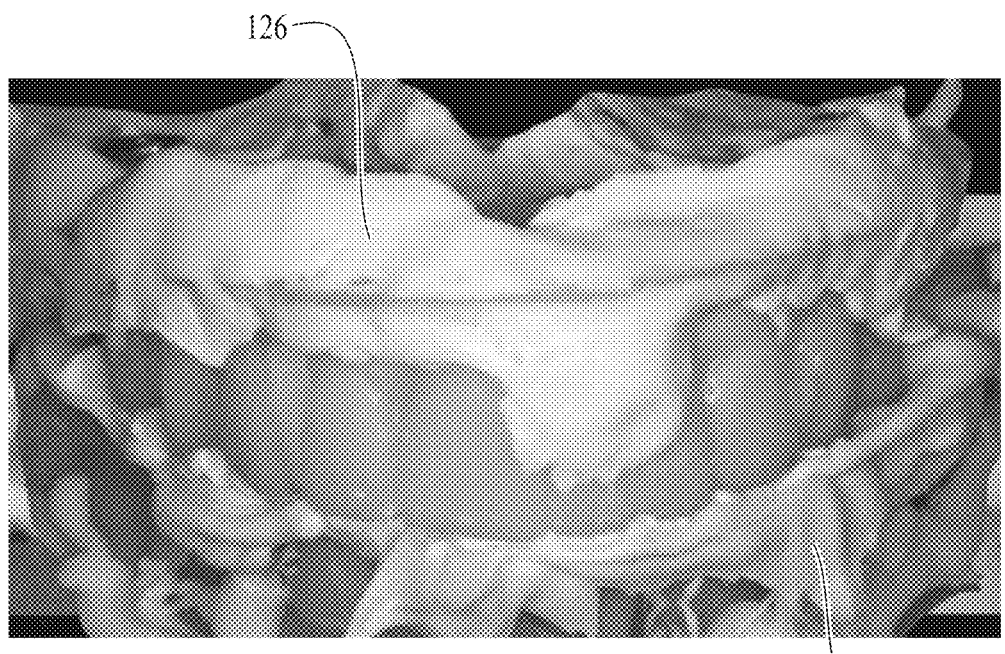
FIG. 14 depicts application of fluent mouth tissue impression material to the intermediate prosthesis.

The step of scanning pre-existing prosthesis 102 to capture data representing the three dimensional configuration of pre-existing prosthesis 102 to generate the virtual representation of pre-existing prosthesis 102 may further comprise incorporating bite registration data into the virtual representation of pre-existing prosthesis 108. As seen in FIG. 14, bite registration data may be taken from bite registration impression material 120, using subsequent scanning.

Figure 9:
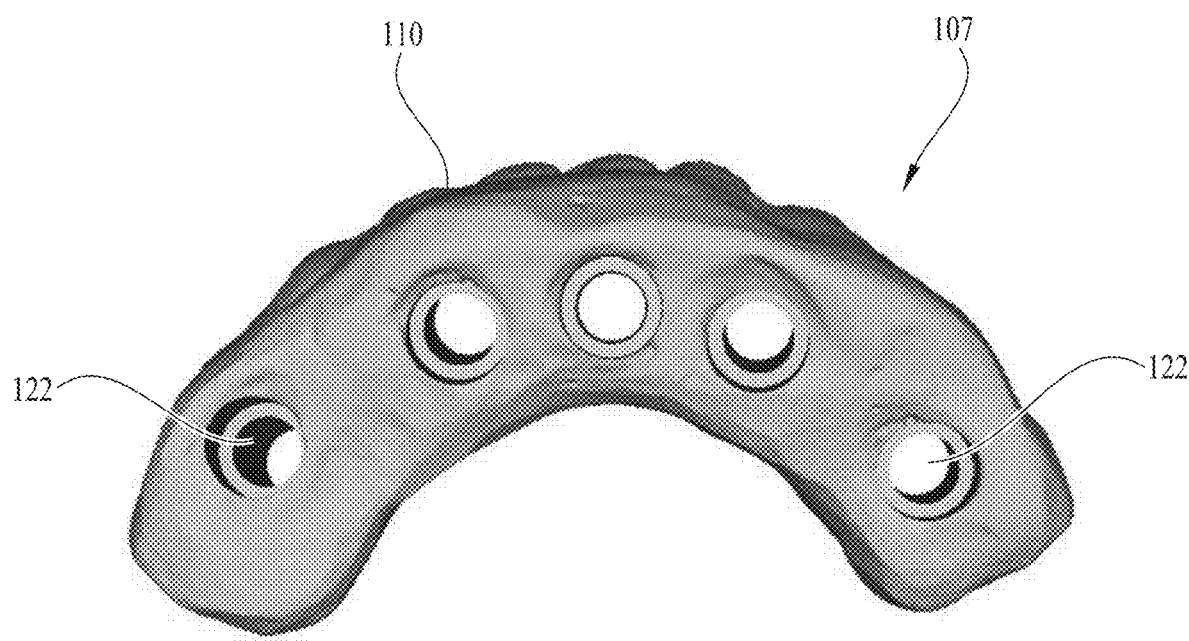
FIG. 9 is a bottom view of the virtual representation of FIG. 8.
Figure 10:
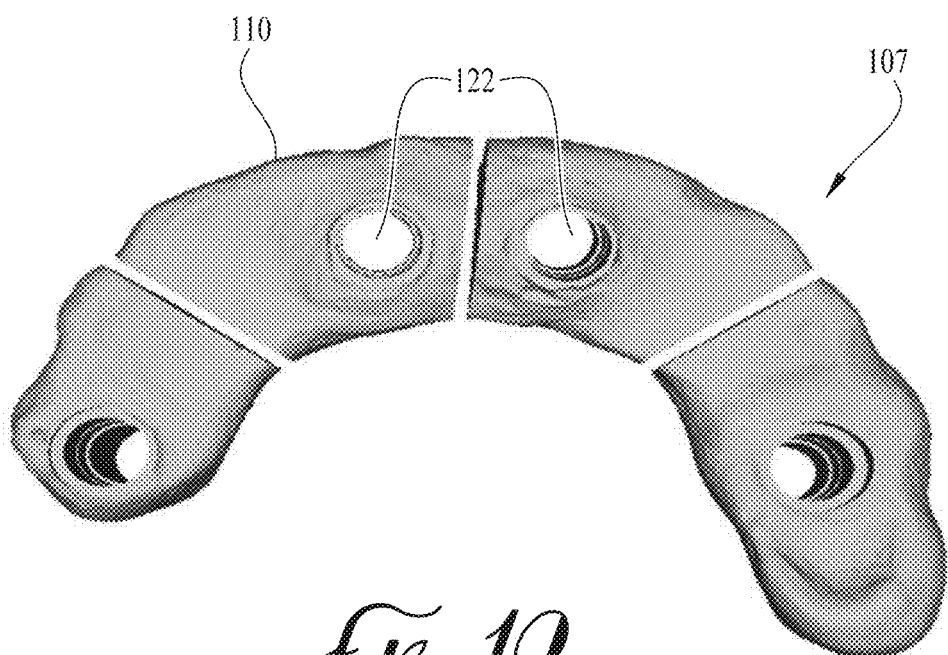
FIG. 10 is a bottom view of FIG. 8, after sectioning but prior to completion.

The step of generating virtual representation 107 of intermediate prosthesis 108 may further comprise digitally subtracting data corresponding to the at least one coping 104 from virtual representation 106 of pre-existing prosthesis 102. The step of digitally subtracting data corresponding to the at least one coping 104 from virtual representation 106 of pre-existing prosthesis 102 may comprise using data from a digital library (not shown), the data corresponding to models of copings 104 being digitally subtracted. FIGS. 9 and 10 show coping openings 122 in virtual representation 107 of intermediate prosthesis 108.

Figure 15:
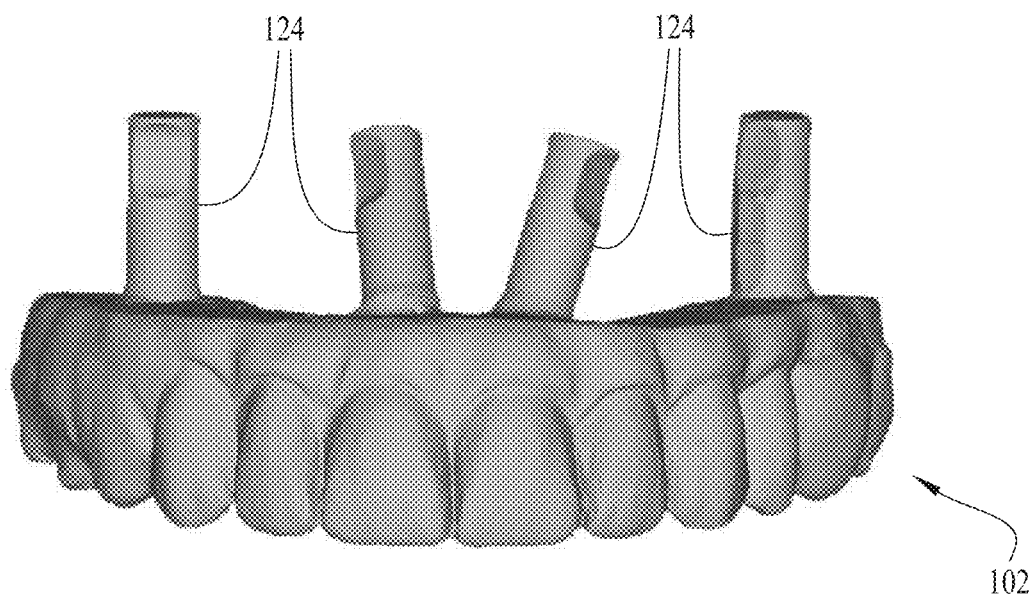
FIG. 15 is a front view of the intermediate prosthesis, showing use of scan analogs.

Referring particularly to FIG. 15, the method may comprise a further step of installing a scan analog 124 on at least one of the copings of pre-existing prosthesis 102 prior to the step of scanning the patient's pre-existing prosthesis 102 to assist in digitally extracting data corresponding to the at least one coping 104 from virtual representation 106 of pre-existing prosthesis 102.

Figure 16:
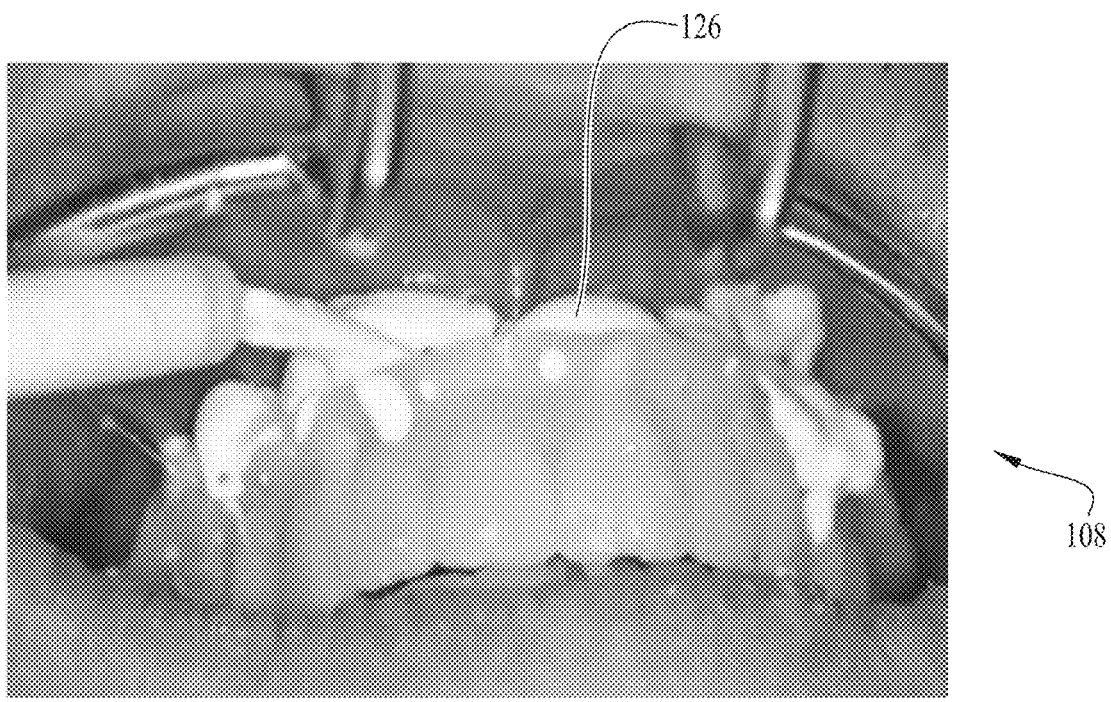
FIG. 16 is an environmental front perspective view of the intermediate prosthesis, notably showing application of hardenable fluids thereto.
Figure 17:
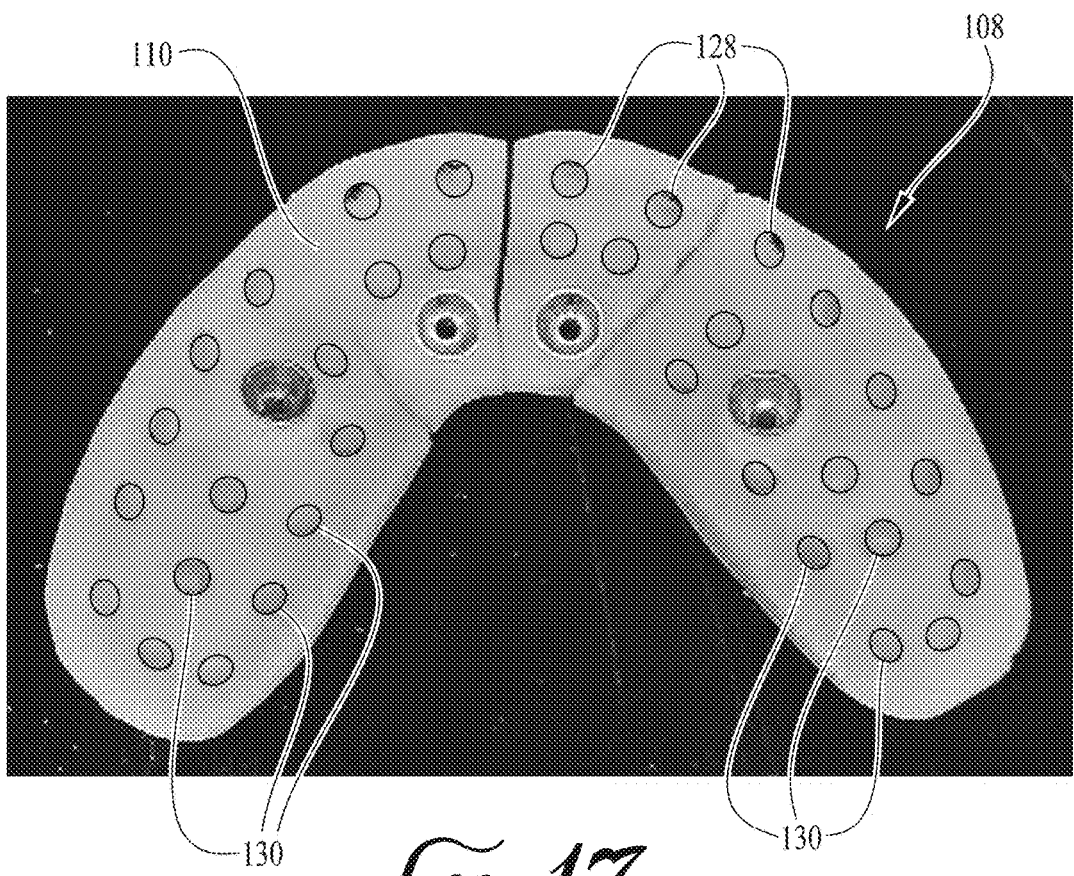
FIG. 17 is a top view of the intermediate prosthesis.

Again referring to FIG. 14 and additionally to FIG. 16, the method may further comprise inserting hardenable tissue impression material 126 between intaglio surface 110 (not visible in FIGS. 14 and 16, but shown in FIGS. 8-10) of the fused intermediate prosthesis 108 and mouth tissue (not visible in FIGS. 14 and 16) to reflect contemplated final physiology of the mouth tissue. Hardenable tissue impression material 126 becomes at least partially bound to intaglio surface 110 of the fused intermediate prosthesis 108 such that intermediate prosthesis 108 now also includes a molded representation of the patient's mouth tissue. Hardenable tissue impression material 126 may be injected from the front of intermediate prosthesis through ports 128 (see FIG. 12). Retention of hardened impression material 126 is promoted by engagement with blind holes 130 (see FIG. 17).

The step of generating virtual representation 107 of intermediate prosthesis 108 may further comprise a step of digitally relieving intaglio surface 110 of intermediate prosthesis 108 to generate relatively greater space for hardenable tissue impression material 126. Notably, intaglio surface 110 may be displaced on the order of 3 mm for this purpose.

In the method, the step of scanning the fused intermediate prosthesis 108 to assist in generating the final virtual representation may comprise scanning the removed fused intermediate prosthesis 108 and hardenable tissue impression material 126, wherein hardenable tissue impression material 126 becomes at least partially bound to intaglio surface 110 of fused intermediate prosthesis 108 such that intermediate prosthesis 108 now also includes a molded representation of the patient's mouth tissue (this feature of intermediate prosthesis 108 is not shown).

The method may further comprise a step of applying an adhesive (not shown) to intaglio surface 110 of intermediate prosthesis 108 to assist in the retention of tissue impression material 126, for example, to supplement retention provided by blind holes 130.

The step of generating virtual representation 107 of intermediate prosthesis 106 may comprise a further step of introducing at least one recess (e.g., blind holes 130 of FIG. 17) into intaglio surface 110 of virtual representation 107 of intermediate prosthesis 106, to enhance retention of hardenable tissue impression material 126. Alternatively stated, blind holes 130 may be produced mechanically in intermediate prosthesis 108 or more easily by digital manipulation of virtual representation 107.

The step of generating virtual representation 107 of intermediate prosthesis 108 may further comprise an additional step of adjusting configuration of the final virtual representation from configuration of the pre-existing prosthesis to reflect changes deemed desirable from the pre-existing prosthesis. Examples of desirable changes include for example shaving actual prosthetic teeth for occlusion or comfort, or for esthetic issues such as alignment of vertical center lines of the upper and lower dental arches. These operations can be scanned, or alternatively, may utilize other methods such as relying on a two dimensional image of the smile for example.

Figure 11:
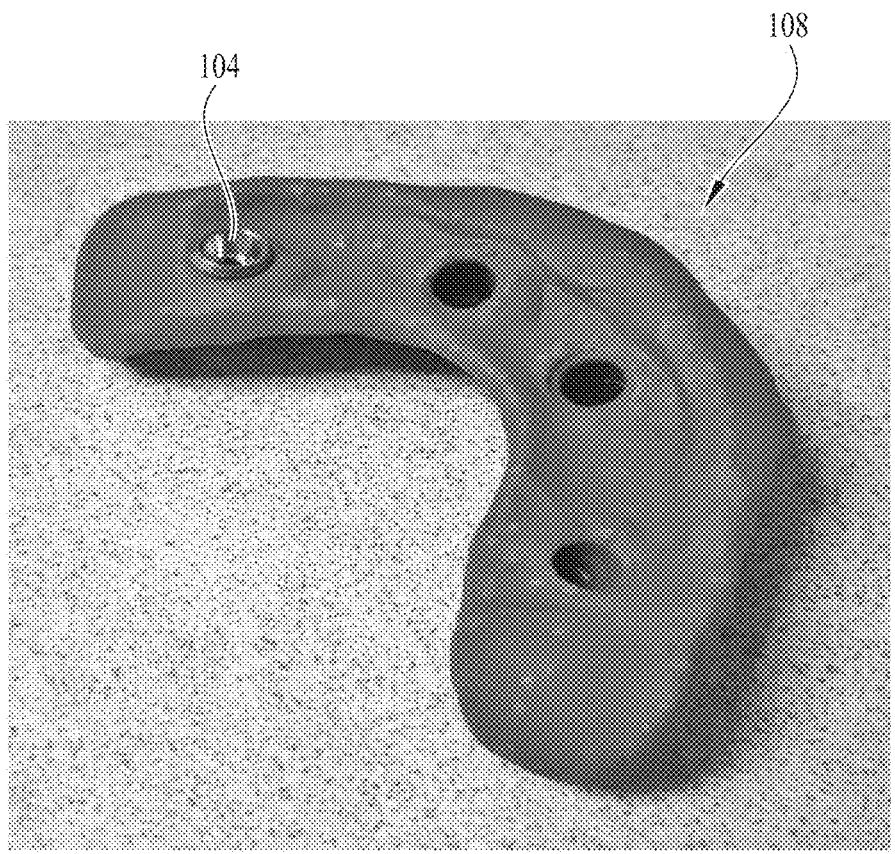
FIG. 11 is a top view of an incomplete intermediate prosthesis generated from the virtual representation of FIGS. 8-10.

The step of fabricating intermediate prosthesis 108 may further comprise the step of installing copings (e.g., such as copings 104) into intermediate prosthesis 108. This is shown in FIG. 11.

The invention may be regarded as a method of generating final working prosthesis 100 of a dental arch from a patient's pre-existing prosthesis 102 of the dental arch, wherein pre-existing prosthesis 102 has at least one coping 104. The method may comprise the steps of scanning the patient's pre-existing prosthesis 102 to capture data representing a three dimensional configuration of pre-existing prosthesis 102 to assist in generating virtual representation 106 of pre-existing prosthesis 102; generating virtual representation 106 of pre-existing prosthesis 102 using captured data; digitally subtracting data corresponding to the at least one coping 104 of pre-existing prosthesis 102 from virtual representation 106 to generate a modified virtual representation 106 of pre-existing prosthesis 102; and generating virtual representation 107 of intermediate prosthesis 108 at least in part from the data derived from modified virtual representation 106 of pre-existing prosthesis 102, wherein virtual representation 106 of pre-existing prosthesis 102 includes intaglio surface 110 and at least one coping opening 122 corresponding closely to the at least one coping 104.

The method further comprises fabricating intermediate prosthesis 108 from virtual representation 107; installing at least one coping 104 into the at least one coping opening 122; installing intermediate prosthesis 108 into the mouth of a patient; scanning intermediate prosthesis 108 to assist in generating a final virtual representation; generating a virtual representation of final working prosthesis 100 using at least in part data from scanning intermediate prosthesis 108; and fabricating final working prosthesis 100 at least in part from the data from virtual representation 107 of intermediate prosthesis 108. In this method, generating the virtual representation of final working prosthesis 100 may rely on additional operations, scans, or other inputs to arrive at a final outer configuration of final working prosthesis 100.

In the latter method, the step of installing at least one coping 104 into the at least one coping opening 122 may further comprise applying adhesive to bond the at least one coping 104 to the at least one coping opening 122. Copings 104 may then be press fit into the preformed coping openings 122.

The latter method may further comprise a step of installing a scan analog 124 on at least one of the copings 104 of pre-existing prosthesis 102 prior to the step of scanning the patient's pre-existing prosthesis 102 to assist in digitally extracting data corresponding to the at least one coping 104 from virtual representation 106 of pre-existing prosthesis 102.

The latter method may comprise a further step of introducing at least one recess (e.g., blind hole 130) into intaglio surface 110 of virtual representation 107 of intermediate prosthesis 108, to enhance retention of hardenable tissue impression material 126.

In the latter method, the step of generating intermediate prosthesis 108 may include a step of digitally relieving intaglio surface 110 of intermediate prosthesis 108.

It should be noted that in either method, in virtual representation 107 of intermediate prosthesis 108, copings 104 can be integral with fabricated intermediate prosthesis 108.

It should be noted at this point that orientational terms such as top and bottom refer to the subject drawing as viewed by an observer. The drawing figures depict their subject matter in orientations of normal use, which could obviously change with changes in position of prostheses as held manually or installed in the mouth. Therefore, orientational terms must be understood to provide semantic basis for purposes of description, and do not limit the invention or its component parts in any particular way.

It will be appreciated that although description of the invention has been presented with reference to application to personal watercraft, those of skill in the art will recognize that there has been presented an accessory mounting suitable from other environmental surfaces, both mobile and stationary.

The present invention is susceptible to modifications and variations which may be introduced thereto without departing from the inventive concepts. For example, a digital flange may be added to help capture the healed tissue position.

It should also be noted that a clinician without a scanner could capture the restoration in a duplicator or flask method by screwing in transfers and sending it to a laboratory. After receiving the flask method the laboratory would be able to reproduce the restoration that the patient has in the mouth. From here the invention would allow the laboratory to scan the prosthesis in a desk top scanner that would produce a 3D file of the restoration, thus enabling the present method and process to create the openings, have new copings installed, and permit sectioning of the restoration ready to be sent to the clinician as illustrated in FIGS. 1, 2, and 8-11.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. A method of generating a final working prosthesis of a dental arch from a patient's pre-existing prosthesis of the dental arch and at least one coping used therewith, which patient's pre-existing prosthesis is one that is already in use within the patient's mouth and will be replaced by the final working prothesis, the method comprising the steps of:
    scanning the patient's pre-existing prosthesis to capture data representing a three dimensional configuration of the patient's pre-existing prosthesis to assist in generating a virtual representation of the patient's preexisting prosthesis;
    generating the virtual representation of the patient's pre-existing prosthesis;
    using the virtual representation of the patient's pre-existing prosthesis to assist in generating a virtual representation of an intermediate prosthesis;
    generating the virtual representation of the intermediate prosthesis;
    fabricating a sectioned intermediate prosthesis from the virtual representation of the intermediate prosthesis;
    installing the sectioned intermediate prosthesis into the mouth of the patient;
    fusing the sections of the intermediate prosthesis together to create a fused intermediate prosthesis having an intaglio surface;
    scanning the fused intermediate prosthesis to assist in generating a virtual representation of the final working prosthesis; and
    fabricating a final working prosthesis at least in part from data from the virtual representation of the fused intermediate prosthesis.

2. The method of claim 1, wherein the step of scanning the patient's pre-existing prosthesis to capture data representing the three dimensional configuration of the patient's preexisting prosthesis to generate the virtual representation of the pre-existing prosthesis further comprises incorporating bite registration data into the virtual representation of the preexisting prosthesis.

3. The method of claim 1, wherein the step of generating the virtual representation of the intermediate prosthesis further comprises digitally subtracting data corresponding to the at least one coping from the virtual representation of the pre-existing prosthesis.

4. The method of claim 3, wherein the step of digitally subtracting data corresponding to the at least one coping from the virtual representation of the patient's pre-existing prosthesis comprises using data from a digital library, the data corresponding to models of the copings being digitally subtracted.

5. The method of claim 1, further comprising a step of installing a scan analog on at least one of the copings of the patient's pre-existing prosthesis prior to the step of scanning the patient's pre-existing prosthesis to assist in digitally extracting data corresponding to the at least one coping from the virtual representation of the pre-existing prosthesis.

6. The method of claim 1, wherein the step of fusing the sections together comprises applying a hardenable cement to the sections.

7. The method of claim 1, further comprising:
    inserting hardenable tissue impression material between the intaglio surface of the fused intermediate prosthesis and mouth tissue to reflect contemplated final physiology of the mouth tissue, wherein the hardenable tissue impression material becomes at least partially bound to the intaglio surface of the fused intermediate prosthesis such that the fused intermediate prosthesis now also includes a molded representation of the patient's mouth tissue.

8. The method of claim 7, wherein the step of generating the virtual representation of the intermediate prosthesis further comprises a step of digitally relieving the intaglio surface of the intermediate prosthesis to generate relatively greater space for the hardenable tissue impression material.

9. The method of claim 7, wherein the step of scanning the fused intermediate prosthesis to assist in generating the final virtual representation comprises removing and then scanning the fused intermediate prosthesis and the hardenable tissue impression material which has become at least partially bound to the intaglio surface of the fused intermediate prosthesis such that the intermediate prosthesis now also includes a molded representation of the patient's mouth tissue.

10. The method of claim 1, wherein the step of generating the virtual representation of the intermediate prosthesis comprises a further step of introducing at least one recess into the intaglio surface of the virtual representation of the intermediate prosthesis, to enhance retention of hardenable tissue impression material.

11. The method of claim 1, wherein the step of generating the virtual representation of the intermediate prosthesis further comprises an additional step of adjusting configuration of the final virtual representation from configuration of the preexisting prosthesis to reflect changes deemed desirable from the pre-existing prosthesis.

12. The method of claim 1, wherein the step of fabricating the sectioned intermediate prosthesis further comprises the step of installing copings into the sectioned intermediate prosthesis.

13. The method of claim 1, wherein the step of fabricating the sectioned intermediate prosthesis from the virtual representation of the intermediate prosthesis is achieved by fabricating the sectioned intermediate prosthesis directly from a virtual sectioned intermediate prosthesis.

14. The method of claim 1, wherein the step of fabricating a sectioned intermediate prosthesis from the virtual representation of the intermediate prosthesis is provided by fabricating the intermediate prosthesis and subsequently sectioning the intermediate prosthesis.

15. A method of generating a final working prosthesis of a dental arch from a patient's pre-existing prosthesis of the dental arch, wherein the pre-existing prosthesis has at least one coping, the method comprising the steps of:
    scanning the patient's pre-existing prosthesis to capture data representing a three dimensional configuration of the patient's pre-existing prosthesis to assist in generating a virtual representation of the patient's pre-existing prosthesis;

generating the virtual representation of the patient's pre-existing prosthesis using captured data;

digitally subtracting data corresponding to the at least one coping of the patient's preexisting prosthesis from the virtual representation to generate a virtual representation of the patient's pre-existing prosthesis;

generating a virtual representation of an intermediate prosthesis at least in part from the data derived from the virtual representation of the patient's pre-existing prosthesis, wherein the virtual representation of the patient's pre-existing prosthesis includes an intaglio surface and at least one coping opening corresponding closely to the at least one coping;

fabricating the intermediate prosthesis from the virtual representation;

installing at least one coping into the at least one coping opening;

installing the intermediate prosthesis into the mouth of the patient;

removing the intermediate prosthesis from the patient's mouth and scanning the intermediate prosthesis to assist in generating a final virtual representation;

generating a virtual representation of the final working prosthesis using at least in part data from scanning the intermediate prosthesis; and fabricating a final working prosthesis at least in part from the data from the virtual representation of the intermediate prosthesis.

16. The method of claim 15, wherein the step of installing at least one coping into the at least one coping opening further comprises applying adhesive to bond the at least one coping to the at least one coping opening.

17. The method of claim 15, wherein the step of digitally subtracting data corresponding to the at least one coping from the virtual representation of the patient's pre-existing prosthesis comprises a step of installing a scan analog on at least one of the copings of the patient's pre-existing prosthesis prior to the step of scanning the patient's pre-existing prosthesis to assist in the digitally extracting data corresponding to the at least one coping from the virtual representation of the patient's pre-existing prosthesis.

18. The method of claim 15, comprising a further step of introducing at least one recess into an intaglio surface of the virtual representation of the intermediate prosthesis, to enhance retention of hardenable tissue impression material.

19. The method of claim 15, wherein the step of generating the intermediate prosthesis includes a step of digitally relieving the intaglio surface of the intermediate prosthesis.

20. A method of generating a final working prosthesis of a dental arch from a patient's pre-existing prosthesis of the dental arch and at least one coping used therewith, the method comprising the steps of:

scanning the patient's pre-existing prosthesis to capture data representing a three dimensional configuration of the patient's pre-existing prosthesis to assist in generating a virtual representation of the patient's pre-existing prosthesis;

generating the virtual representation of the patient's pre-existing prosthesis;

using the virtual representation of the patient's pre-existing prosthesis to assist in generating a virtual representation of an intermediate prosthesis;

generating the virtual representation of the intermediate prosthesis;

fabricating a sectioned intermediate prosthesis from the virtual representation of the intermediate prosthesis;

installing the sectioned intermediate prosthesis into the mouth of the patient;

fusing the sections of the intermediate prosthesis together to create a fused intermediate prosthesis having an intaglio surface;

inserting hardenable tissue impression material between the intaglio surface of the fused intermediate prosthesis and mouth tissue to reflect contemplated final physiology of the mouth tissue, wherein the hardenable tissue impression material becomes at least partially bound to the intaglio surface of the fused intermediate prosthesis such that the fused intermediate prosthesis now also includes a molded representation of the patient's mouth tissue;

applying an adhesive to the intaglio surface of the fused intermediate prosthesis to assist in the retention of the hardenable tissue impression material to the intaglio surface of the fused intermediate prosthesis;

scanning the fused intermediate prosthesis to assist in generating a virtual representation of the final working prosthesis; and fabricating a final working prosthesis at least in part from data from the virtual representation of the fused intermediate prosthesis.

* * * * *